(12) United States Patent
Weigl et al.

(10) Patent No.: US 6,380,848 B1
(45) Date of Patent: Apr. 30, 2002

(54) STRUCTURAL THEFT PROTECTION FOR MOTOR VEHICLES

(75) Inventors: Andreas Weigl, Linkenheim-Hochstetten; Bernd Herrmann, Sachsenheim; Ulrich Koelle, Schwieberdingen; Helmut Randoll, Vaihingen; Robert Hugel, Karlsruhe, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/849,169

(22) PCT Filed: Nov. 3, 1995

(86) PCT No.: PCT/DE95/01514

§ 371 Date: May 27, 1997

§ 102(e) Date: May 27, 1997

(87) PCT Pub. No.: WO96/16845

PCT Pub. Date: Jun. 6, 1996

(30) Foreign Application Priority Data

Nov. 25, 1994 (DE) .......................... 44 42 103

(51) Int. Cl.⁷ .............................................. G08B 21/00
(52) U.S. Cl. ................. 340/426; 340/539; 340/825.34; 307/10.2; 307/10.3; 307/10.4; 307/10.5; 180/287
(58) Field of Search ................. 340/426, 539, 340/825.34; 307/10.2, 10.3, 10.4, 10.5; 180/287

(56) References Cited

U.S. PATENT DOCUMENTS

| | | |
|---|---|---|
| 4,302,747 A | 11/1981 | Belmuth .................... 180/287 |
| 4,805,722 A | 2/1989 | Keating et al. ............. 180/287 |
| 5,486,806 A * | 1/1996 | Firari et al. ................. 340/426 |
| 5,510,780 A * | 4/1996 | Norris et al. .......... 340/825.56 |
| 5,519,260 A * | 5/1996 | Washington ............... 307/10.5 |

FOREIGN PATENT DOCUMENTS

| | | |
|---|---|---|
| DE | 3908029 A1 * | 9/1990 |
| DE | 3908029 | 9/1990 |
| DE | 4016142 | 11/1991 |
| DE | 4216326 | 11/1993 |
| DE | 4240458 | 12/1993 |
| DE | 4243482 | 6/1994 |
| DE | 4320174 | 12/1994 |
| EP | 0 680 859 A2 | 3/1995 |
| GB | 2119552 | 11/1983 |
| JP | 61-150853 * | 7/1986 |
| JP | 61150853 | 9/1986 |

* cited by examiner

*Primary Examiner*—Julie Lieu
(74) *Attorney, Agent, or Firm*—Venable; Norman N. Kunitz

(57) ABSTRACT

The invention relates to a structural theft protection system for motor vehicles with a blocking control device (30) for releasing a motor control device (31), a code acquisition device (20, 21) that is connected to the blocking control device, and a device (32) connected to the blocking control device (30) for acquiring a vehicle use parameter (T, S), as well as with several locally fixed code takeover/output stations (10, 11), wherein the blocking control device (30) keeps the motor control device (31) in the release position only if the blocking control device (30) is fed a new release information by one of the locally fixed code takeover/output stations (10, 11), preferably at regular intervals.

8 Claims, 4 Drawing Sheets

STRUCTURAL THEFT PROTECTION FOR MOTOR VEHICLES

BACKGROUND OF THE INVENTION

The invention concerns a theft protection device for motor vehicles. In order to counter a rising number of motor vehicle thefts, stop-drive devices are used increasingly especially in new vehicles. The operation of said devices is based on releasing the functions of at least one motor control device that is essential for the vehicle operation only if a code that is entered from the outside into the stop-drive device coincides with a code previously stored inside the stop-drive device. Devices of this type ensure a high degree of safety against attempted thefts, provided the secured vehicle is parked and the potential thief is not in possession of the regular means for starting. However, there has been a tendency in recent times to steal vehicles not through irregular starting, but through so-called "car-jacking." In that case, a thief forces the vehicle user to hand over the regular starting means and then has unlimited access to the vehicle. A device for safeguarding a vehicle, which at least makes car-jacking more difficult, is known from the U.S. Pat. No. 4,302,747. A vehicle secured in accordance with the suggestion in this reference is shut down following a predetermined time interval that begins with the starting of the engine, provided a hidden switch to prevent this is not activated. However, even this known device loses its protective effect, in particular for a car-jacking, if a thief proceeds on the assumption that such a switch exists— which will usually be the case when such protective devices are more widely used—and orders the user to provide a complete explanation of all safety devices. A safety device using the option of wireless communication between a vehicle and a locally fixed monitoring station is known from the DE-OS 42 43 482. In this case, a check is made with the aid of signals exchanged between a locally fixed monitoring station and the secured vehicle to determine whether an authorization-check communication occurs as required within the vehicle between a transmitting device on the vehicle and a transmitting device integrated into the ignition key that is handled by the user. If an error occurs in the authorization-check communication, in particular if it does not occur at all because the vehicle was short-circuited, then this is detected in the locally fixed monitoring station. The stolen vehicle can be located with the aid of identification data transmitted to the monitoring station without the knowledge of the illegal user. This arrangement as well is useless in cases where the thief has taken possession of the regular starting means, in this case the ignition key.

SUMMARY OF THE INVENTION

It is the object of the invention to provide a safety device for vehicles, which prevents the illegal takeover of a vehicle even in cases where a potential thief has taken possession of the standard starting means.

Vehicles equipped according to the invention require the regular renewal of the release for operation by feeding in a release information, generated by locally fixed code takeover/output stations. By blocking the output of this release information, the further operation of a vehicle can be prevented easily. The release information functions like a necessary operating means, which is no longer supplied in case of an illegal start-up. This makes the theft of a vehicle unappealing, even if the thief is in possession of the correct starting means and has knowledge of the design of the safety device.

In an advantageous embodiment, the release information that is necessary for further operation is supplied with the aid of a chip card of the type like a credit or telephone card. Code acquisition devices on the vehicle or locally fixed code takeover/output stations are correspondingly designed as card reading or card reading/recording devices. It is particularly advantageous if the locally fixed card reading/recording stations are erected at gasoline stations. The release information on the chip card is renewed each time during the fueling.

Another advantageous embodiment provides that the code acquisition device on the vehicle is designed as a receiving device for the radio signals and the locally fixed code takeover/output device as a radio signal transmitter/receiver. The regular renewal of the release information occurs via wireless in this case. For a sensible modification of this embodiment, the code acquisition device is also suited for emitting signals, by means of which it requests the release information in each case.

In a simple way, the operating time or the distance are applied as a vehicle use parameter for determining the driving range that is respectively valid following the input of a release information.

In accordance with another advantageous embodiment, the respective vehicle position is acquired as a vehicle use parameter, and the acquired position is compared to a driving range that was previously defined as release information.

If the release information does not arrive, it is further advisable to shut down the vehicle gradually upon leaving the driving range, for example by initially limiting the maximum speed.

DESCRIPTION OF THE PREFERRED EMBODIMENTS

Figure 1:
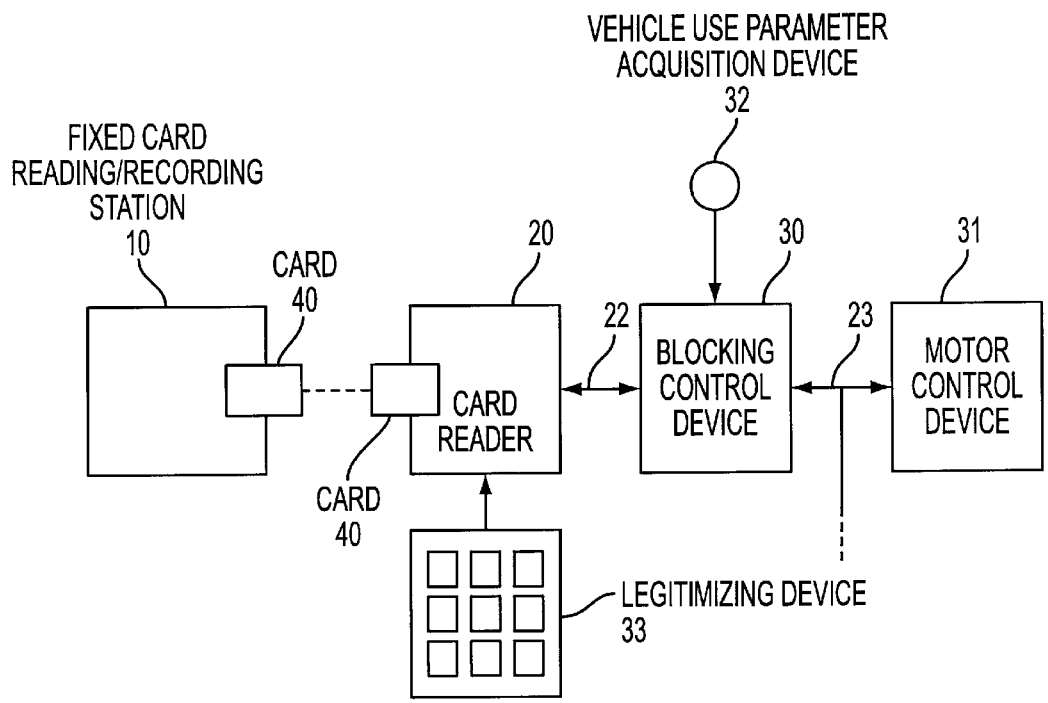
FIG. 1 shows a safety device that operates with a chip card.

The embodiment shown in FIG. 1 is based on the use of a recordable magnetic or chip card 40. It has a card reader 20 on the vehicle side to read the chip card 40. This can be either a card reader already existing in the vehicle, as is increasingly used to secure auto radios, or a separate device. A blocking control device 30 is connected to the card reader 20 via an advisably serial transmission path. Via a connection 23, it controls the release or blocking of a downstream motor control device 31. The motor control device 31 can be any optional control device in a vehicle, which if blocked prevents a continued operation or renewed start of the vehicle. Also, several control devices can be connected simultaneously via this connection 23 to the blocking control device 30. A legitimizing device 33 can additionally be provided to ensure that the card reader 20 and the blocking control device 30 belong together, for example a type of keyboard as indicated in FIG. 1. Via this keyboard, a user assigns an authorization code to the card reader 20, which is fed to the blocking control device 30 and is checked there. Of course, the legitimizing device 33 can be realized in any optional form in place of a keyboard, such as for example in the form of an infrared sensor. Also, the legitimizing device 33 can act directly upon the blocking control device 30 instead of the card reader 20. Also connected to the blocking control device 30 is a device 32 for detecting or acquiring a vehicle use parameter. Detected parameters are preferably the traveled distance, the operating time and/or the vehicle position. Other components of the safety device are furthermore several locally-fixed card/reading/recording stations 10 that do not belong to the secured vehicle, which can read the code card 40 as well as record new information on it. It is preferable, if the card reading/recording stations 10 are located at gasoline stations. It is also advisable if the vehicle owner has a separate card reading/recording station 10, which can access only the cards associated with a specific vehicle. The standard magnetic or chip cards in credit-card format are used as code cards 40. They have an additional area for recording. It is useful if the code card 40 simultaneously functions as a gasoline credit card.

By taking reference to FIG. 2, the operation of the arrangement shown in FIG. 1 is described in the following. In order to start the vehicle, an initialization is required first, the step 100. For this, the user inserts the code card 40 into the card reader 20. At the same time, the user legitimizes him-/herself by entering a code via the keyboard 33. If the blocking control device 30 accepts the code entered via the keyboard 33 as being valid, then the card reader 20 reads the information supplied by the code card 40 and transmits it to the blocking control device 30. This device subsequently checks if a valid old release information is present, step 101. It is always present if the detected vehicle use parameter has not exceeded a maximum value and can, for example, be realized in the form of data for the still allowable residual vehicle operation time. The old release information is stored in the vehicle, in a memory designed for this, but can also be fed in each time via the code card 40.

If no valid old release information exists, then the blocking control device 30 subsequently checks whether a new release information exists on the code card 40, step 102. If this is the case, then it generates an old release information and records this in the memory existing for this or alternatively on the code card 40, thereby deleting the new release information from the code card 40. Furthermore, in step 103, it resets the values detected for the vehicle use parameters to their predetermined starting values. For example, if the traveled distance is used as a vehicle use parameter, then it will be reset to the value zero. Following that, the blocking control device 30 starts the acquisition of the vehicle use parameter; step 104.

If as a result of the check in step 101 it turns out that a valid old release information exists in the blocking control device 30, then step 104 follows directly after step 102. In that case, the vehicle use parameters are not reset.

In the subsequent step 105, the blocking control device 30 checks whether a predetermined maximum value was exceeded for the detected vehicle use parameter, for example the distance traveled since the point of access to the last new release information and/or the operating time accrued since then.

The maximum value is advisably matched to the technical design of the respective vehicle. It makes sense if the maximum value for the traveled distance is, for example, selected such that it is slightly higher than that for the distance a vehicle can travel under favorable conditions with one tank filling. In a similar way, the maximum value for the operating time usefully corresponds to the idle operating life resulting from a full tank. Alternatively to the fixed, predetermined value, variable maximum values can also be provided and can be fed via the code card 40 to the blocking control device 30, respectively together with the release information. In this way, the length of use can be limited to an agreed-upon value, for example for rental vehicles.

As long as the maximum value has not been reached, the acquisition of the vehicle use parameter is continued, step 104. Following each completion of a cycle interval, which can last from 1 to 60 seconds for example, the interrogation according to step 105 is repeated and subsequently step 104 if necessary.

If the check during step 105 shows that the maximum vehicle use parameter value has been reached, then the blocking control device 30 deletes the existing old release information and subsequently checks during step 102 whether a new release information from code card 40 is present. If this is the case, then the steps 103 are subsequently repeated in the following. If a new release information is not present during the step 102, then the blocking control device 30 limits the use of the vehicle during the step 106. For this, it reduces the maximum possible rotational speed of the motor, for example, or limits the top speed. It is advisable if the limited operation is signaled to the user acoustically or optically, for example through blinking or an error lamp. The blocking control device 30 checks in the following step 108 whether a predetermined overtime has passed since the lack of a valid old release information was detected during step 102. If this is not yet the case, then it repeats step 102 and checks again whether a new release information has arrived. If the check during step 108 finally shows that the predetermined overtime has passed, then the blocking control device 30 blocks the motor control device 31 during the step 110.

Figure 3:
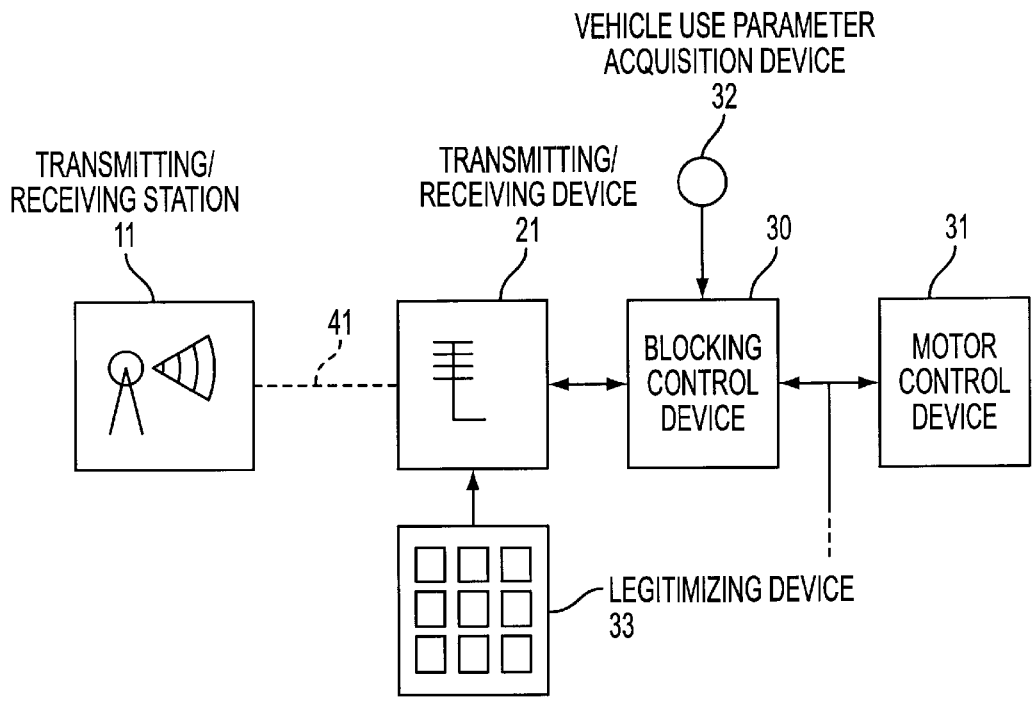
FIG. 3 shows a flow diagram of a first operational mode.

FIG. 3 shows a second embodiment of the suggested safety device. In place of a card reader 20, a transmitting/receiving device 21 is provided on the vehicle side for this arrangement. It is preferable if the transmitting/receiving device 21 comprises a transmitting/receiving antenna attuned to an existing radio network. The other elements of the device on the vehicle side correspond to those already described with the aid of the device in FIG. 1. For this embodiment, a transmitting/receiving station 11 serves as locally fixed element for emitting radio signals. It is useful if the transmitting/receiving stations 11 are stationary transmitting/receiving devices of an existing movable radio network 21.

Figure 2:
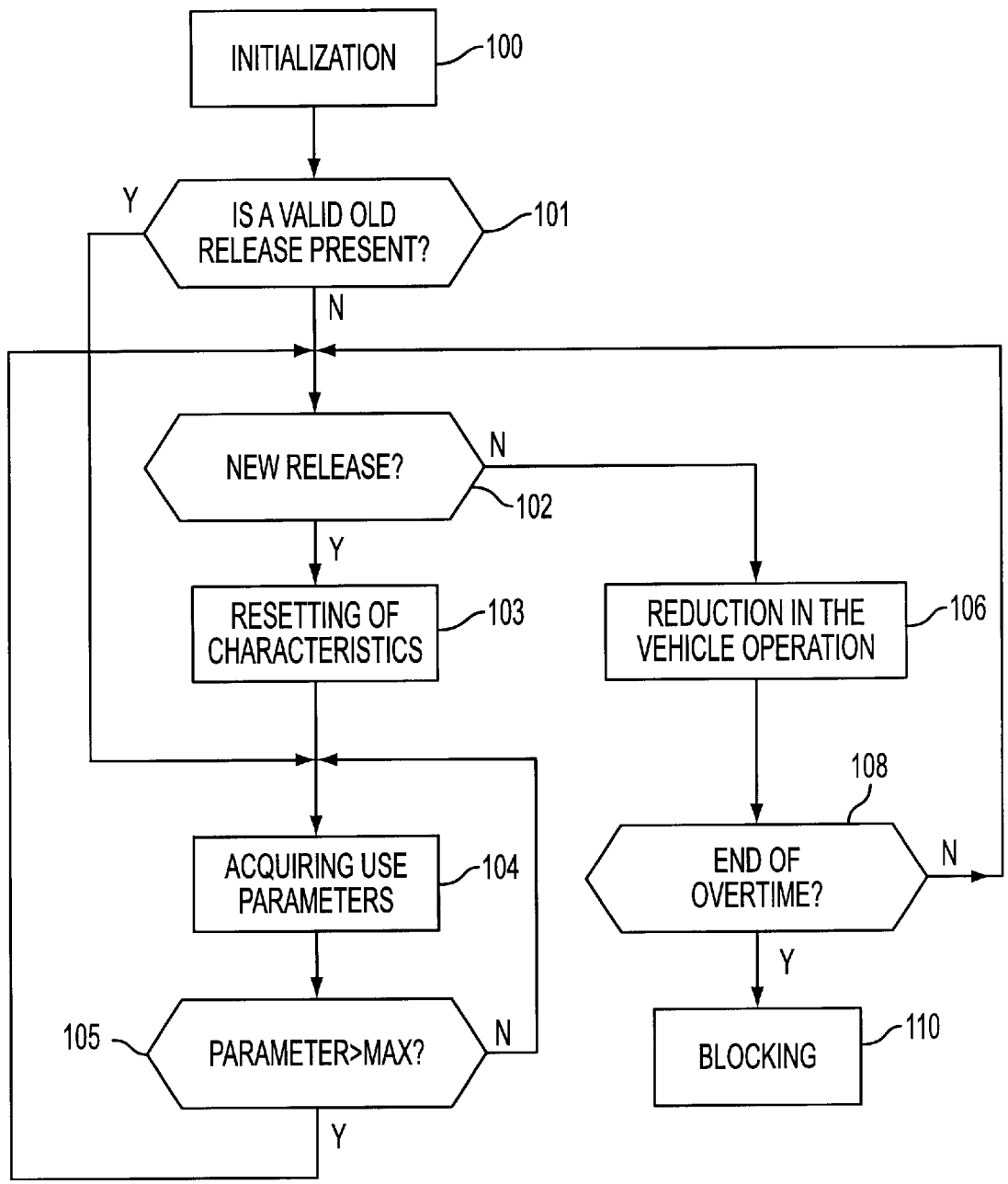
FIG. 2 shows a safety device that operates by means of radio signals.

The operation of the second embodiment corresponds for the most part to the device according to FIG. 1 and can also be described with the aid of FIG. 2. After initiating the start of operations, the blocking control device 30 first checks whether a valid old release information exists, step 101. If this is the case, then the acquisition of the vehicle use parameters during step 104 follows immediately.

If this is not the case, then the blocking control device 30 requests a new release information via the transmitting/receiving device 21 and the radio network 41 of a transmitting/receiving station. This is followed by a check during step 102 on whether a new release information has arrived. If this is the case, an old release information is generated in step 103 and the values for the acquired vehicle use parameters are reset to their initial values. It is advisable if the acquired parameters are the traveled distance and/or the operating time since the arrival of the last preceding new release information, the same as for the device in FIG. 1. This is again followed by the acquisition of the vehicle use parameters during the step 104, as well as the check on whether the acquired parameters exceed predetermined maximum values, step 105. The predetermined maximum values here are adapted to the frequency, used to supply new release information to the transmitting/receiving device 21 via the radio network 41. It can assume an optional value between several seconds and several hours. If the result of the check in step 105 is negative, then step 104 is repeated once more. If the result of the check in step 105 is positive, meaning if the acquired vehicle use parameter has reached the predetermined limit value, then the blocking control device 30 repeats the step 102 and checks whether a new release information has arrived. It is conceivable that the blocking control device 30 requests a new release information only if the acquired vehicle use parameter value reaches the maximum value. In that case, the check in step 102 is preceded by a request (not shown) for a new release signal. If the check in step 102 shows that a new release information is not present, the blocking control device 30 reduces the vehicle use in step 106. This is followed by a check on whether a predetermined overtime has passed, during which a limited use of the vehicle is still possible despite the lack of a release information, step 108. If this is not yet the case, then it is checked again—step 102—whether a new release information has arrived. If the check in step 106 reveals that the overtime has passed, then the blocking control device 30 blocks the motor control device 31 and thus stops the vehicle, step 110.

Figure 4:
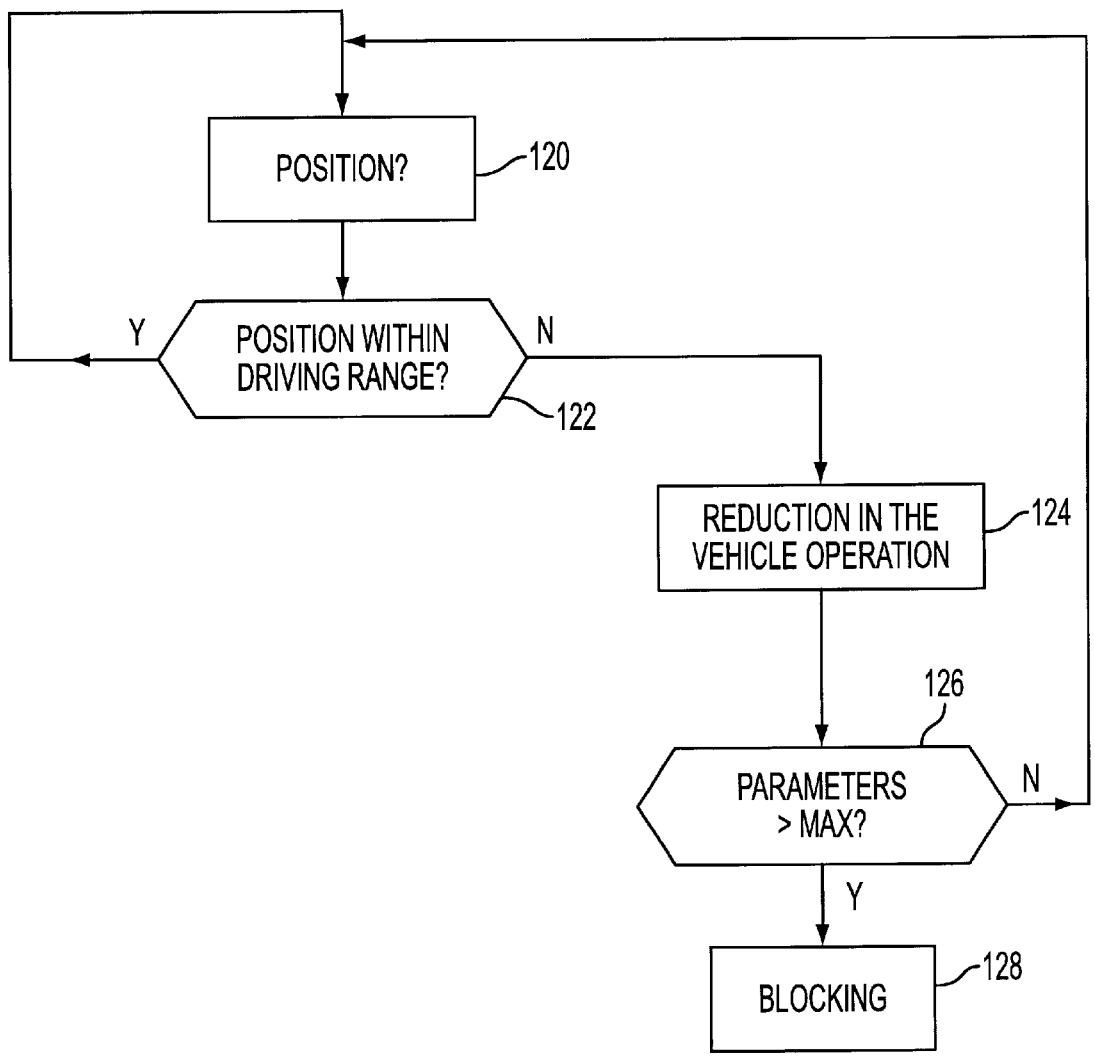
FIG. 4 a flow diagram of a second operational mode.

FIG. 4 demonstrates another option of operating the device according to FIG. 3. For this operational mode, information is transmitted in place of the release information via the radio network 41, which permits the blocking control device 30 to determine the actual vehicle position, step 120. The respectively determined position is subsequently analyzed by the blocking control device 30 as to whether it is located within a predetermined driving range, step 122.

The driving range is determined before the vehicle starts operating and is stored in a memory in the blocking control device. The driving range is defined outside of the vehicle, for example with the aid of a home computer or a special programming device. A code card system with code card 40 and card reader 20, analogous to the arrangement in FIG. 1, is again useful for transferring the data determining the driving range to the blocking control device 30.

The programming station used for this is clearly assigned to the vehicle by a code determined by the vehicle manufacturer. A programming can take place only if the vehicle code and a code determined by the user match.

If the check during step 122 shows that the detected position is within the predetermined driving range, then the position determination according to step 120 is repeated following the completion of a suitable time interval, which can optionally be between several seconds and several hours. If the check in step 122 shows that the detected position is located outside of the predetermined driving range, then the blocking control device 30 reduces the use of the vehicle during the step 124. This can be achieved, for example, again by limiting the rotational speed of the engine or the maximum speed. In the following, the blocking control device 30 checks in step 126 whether the detected vehicle use parameter has reached a predetermined maximum value. In this case, the maximum value gives the user the option of returning the vehicle to the predetermined driving range after it has accidentally left the permissible driving range; it is determined accordingly. If the maximum value for the vehicle use parameters has not been reached, then step 120 is repeated. If the check in step 126 shows that the detected vehicle use parameter has reached the maximum value, then the blocking control device 30 again blocks the motor control device 31, step 128.

Figure 5:
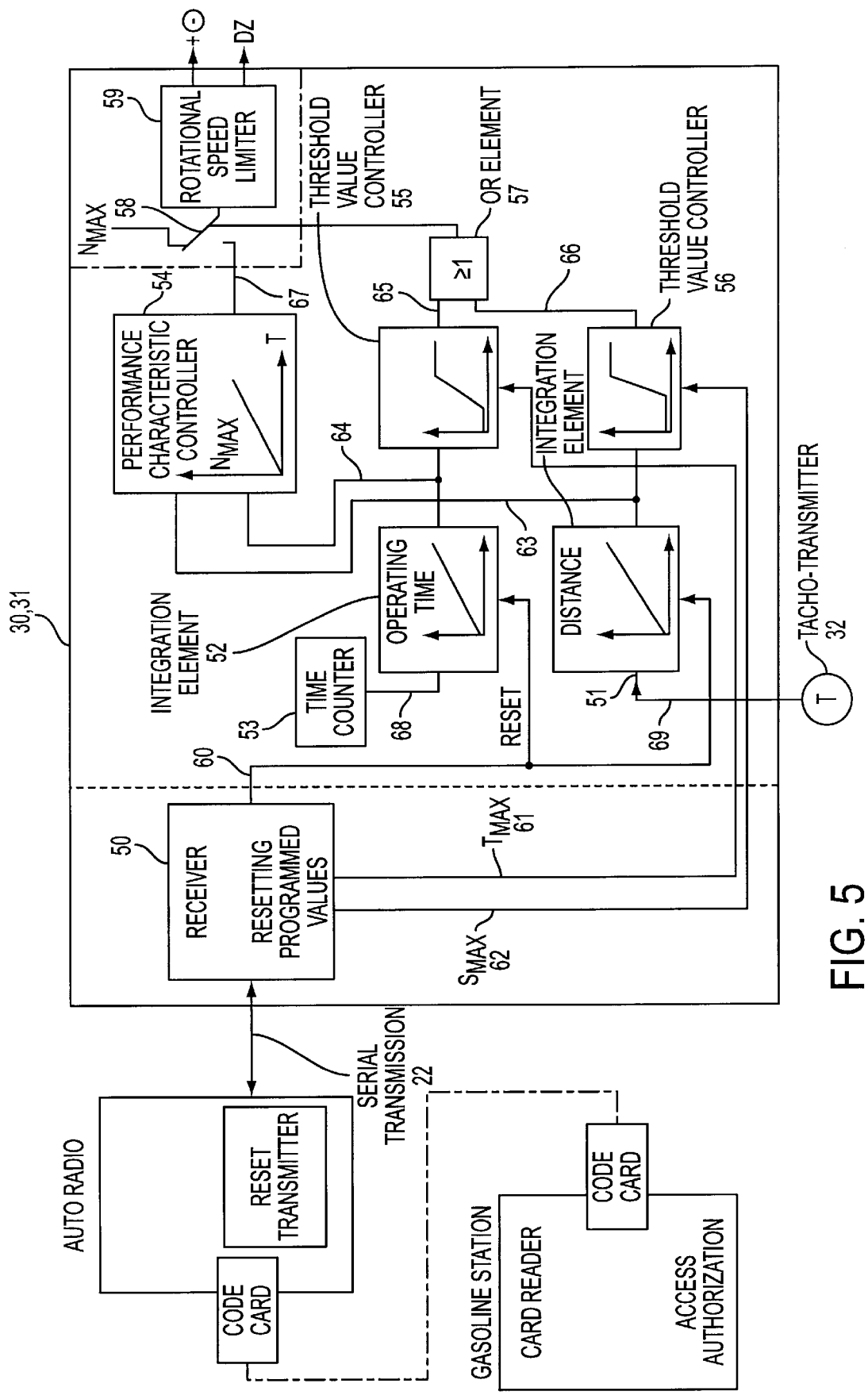
FIG. 5 a realization of the blocking function.

FIG. 5 provides a detailed illustration of the elements of the device that realize the blocking function. The blocking control unit 30 is here realized as a component of the motor control device 31. The transmission path from the card reading or transmitting/receiving module that is not shown in FIG. 5, is conducted to a receiver 50. From it, a reset output 60 leads to a first integration element 51 for acquiring the traveled distance and a second integration element 52 for acquiring the operating time. Two other outputs 61, 62 for presetting a maximum operating time $t_{MAX}$ or maximum distance $S_{MAX}$ respectively lead to a threshold value controller 55, 56. Integration element 51 and threshold value controller 56 are connected to a performance characteristic controller 54 via a joint output 63. The integration element 52 and the threshold value controller 55 are connected in the same way via a joint output 64 with the performance characteristic controller 54. Via outputs 65, 66, the threshold value controllers 55 or 56 are connected to an OR element 57. Its output controls a circuit 58 that permits separating a connection 67 between performance characteristic controller 54 and a downstream rotational speed limiter 59. Furthermore, a time counter 53 for detecting the operating time is connected via an input 68 to the integration element 52. The pulses of a tacho-transmitter 32 are fed in a similar way to the second integration element 51 via an input 69.

The device shown in FIG. 5 functions as follows: If a user has legitimized him-/herself by entering a correct code, for example via a keyboard 33, then the release information supplied to the card reader 20 or the transmitting/receiving module 21 is fed via the serial transmission path 22 to the receiver 50. This receiver resets the information elements 51, 52 to their starting values. Furthermore, it transmits the previously programmed limit values for the operating time T or the distance S to the threshold controllers 55, 56. While the vehicle is in operation, the integrating elements 51, 52 continuously add the information supplied by the time counter 53 or the tacho transmitter 32 with respect to the operating time T or the traveled distance S. The determined values for the operating time T or the traveled distance S are supplied to the performance characteristic controller 54, which assigns them a maximum rotational motor speed $N_{MAX}$ and transmits it to the rotational speed limiter 59. The circuit 58 here is initially closed. At the same time, the vehicle use parameters T, S that are detected by the integration elements 51, 52, are fed to the threshold value controllers 55, 56. This controller assigns them the logical values zero to 1, in accordance with a non-linear control function. In this case, the value logic zero is assigned as long as the respective vehicle use parameter has not yet reached the limit value $t_{MAX}$ or $S_{MAX}$ preset by the receiver 50. If the detected vehicle use parameters t, S exceed the preset limit values $T_{MAX}$, $S_{MAX}$, then the values logic ONE are assigned to them the more they exceed. At the same time, the performance characteristic controller 54 assigns increasingly smaller maximum motor speeds $N_{MAX}$ to the vehicle use parameters T, S that exceed the preset maximum values $T_{MAX}$, $S_{MAX}$ and transmits these to the rotational speed limiter 59. As long as the inputs 65 and 66 at the OR element 57 together do not result in the logic value ONE, it is possible to operate the vehicle at a reduced maximum speed $N_{MAX}$. However, the circuit 58 is activated as soon as the sum of the inputs 65 and 66 at the OR element 57 results in the value ONE. The rotational speed limiter 59 is then supplied a desired rotational speed determined by the performance characteristic controller 54. This speed decreases the more the maximum values $T_{MAX}$, $S_{MAX}$ are exceeded, until finally the value zero is reached, whereupon the vehicle is stopped. If a new release information arrives at the receiver 50 while the integration elements 51, 52 add the traveled distance S or the operating time t, then the integration elements 51, 52 are reset. A continuous operation of the device according to FIG. 5 is therefore possible if a new release information arrives regularly, before the detected vehicle performance parameters T, S reach the preset maximum values $S_{MAX}$, $T_{MAX}$.

By holding on to the underlying idea, a plurality of embodiments of the invention is possible. This is true for the structural design of the safety devices used, as well as in particular for the operating modes of the device.

What is claimed is:

1. A theft protection system for a motor vehicle, comprising:
   a motor control device (31) in the vehicle;
   a blocking control device (30), in the vehicle, for releasing the motor control device (31);
   a device (20) connected to the blocking control device for reading a code card (40); and
   a device (32) connected to the blocking control device (30) for acquiring a vehicle use parameter (T, S),
   wherein the blocking control device (30) keeps the motor control device (31) in a released position only as long as the acquired vehicle use parameter (T,S) has not yet reached a predetermined maximum value ($T_{MAX}$, $S_{MAX}$) and an old release information is available,
   wherein the release is renewed if a new release information stored on the code card (40) is fed to the blocking control device (30), the blocking control device (30) then generating a valid old release information from the new release information, resetting the vehicle use parameter (T, S,) to its initial value, and deleting the new release information from the code card (40), and
   wherein the system additionally comprises a locally fixed device (10) at a gasoline station for renewing the release information on the code card (40).

2. The theft protection system according to claim 1, wherein the release is respectively limited to an operation within a driving range, which is defined by predetermined vehicle use parameters ($T_{MAX}$, $S_{MAX}$).

3. The theft protection system according to claim 1, wherein the detected vehicle use parameter is the operating time (T) or the traveled distance (S).

4. The theft protection system according to claim 1, wherein the release information comprises information for defining a driving range.

5. The theft protection system according to claim 1, wherein the locally fixed device (10) at a gasoline station is designed as a mobile equipment.

6. The theft protection system according to claim 1, wherein the release of the motor control device (31) occurs only if the user has legitimized him-/herself with the aid of a legitimizing device (33).

7. The theft protection system according to claim 1, wherein the detected vehicle use parameter is the actual position of the vehicle, wherein the release information contains data on the driving range, and wherein the blocking control device (30) releases the motor control device (31) only if the actual position is within the driving range.

8. The theft protection system according to claim 7, wherein the blocking control device (30) gradually reduces the operational readiness of the vehicle if the detected vehicle use parameter indicates that the vehicle is located outside of the predetermined driving range.

* * * * *